United States Patent
Li et al.

(10) Patent No.: US 12,261,798 B2
(45) Date of Patent: Mar. 25, 2025

(54) INDICATION METHOD AND DEVICE, INDICATION INFORMATION RECEIVING METHOD AND DEVICE, COMMUNICATION NODE, AND MEDIUM

(71) Applicant: ZTE Corporation, Shenzhen (CN)

(72) Inventors: Yong Li, Shenzhen (CN); Hao Wu, Shenzhen (CN); Zhaohua Lu, Shenzhen (CN); Yuxin Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 452 days.

(21) Appl. No.: 17/773,643

(22) PCT Filed: Nov. 3, 2020

(86) PCT No.: PCT/CN2020/126027
§ 371 (c)(1),
(2) Date: May 2, 2022

(87) PCT Pub. No.: WO2021/088778
PCT Pub. Date: May 14, 2021

(65) Prior Publication Data
US 2022/0399975 A1   Dec. 15, 2022

(30) Foreign Application Priority Data

Nov. 4, 2019 (CN) .......................... 201911067171.5

(51) Int. Cl.
*H04L 5/00* (2006.01)
*H04B 7/0456* (2017.01)

(52) U.S. Cl.
CPC ......... *H04L 5/0051* (2013.01); *H04B 7/0456* (2013.01)

(58) Field of Classification Search
CPC ... H04L 5/0051; H04L 5/0094; H04L 5/0023; H04L 5/0053; H04L 5/0044; H04B 7/0456

See application file for complete search history.

(56) References Cited

U.S. PATENT DOCUMENTS

| 12,004,082 B2 * | 6/2024 | Wang ................ H04W 52/0235 |
| 2013/0114498 A1 * | 5/2013 | Park ...................... H04W 52/04 370/312 |

(Continued)

FOREIGN PATENT DOCUMENTS

| CA | 3066296 A1 | 2/2019 |
| CN | 107231691 A | 10/2017 |

(Continued)

OTHER PUBLICATIONS

European Search Report for corresponding application EP20884314: Report dated Dec. 20, 2023.

(Continued)

*Primary Examiner* — Brian D Nguyen
(74) *Attorney, Agent, or Firm* — CANTOR COLBURN LLP

(57) ABSTRACT

Provided are an indication method and apparatus, a method and apparatus for receiving indication information, a communication node, and a medium. The method includes determining indication information of a target reference signal resource, where an antenna port corresponding to the target reference signal resource corresponds to an antenna port of a transport channel through a precoding matrix, and transmitting the indication information.

19 Claims, 2 Drawing Sheets

Determine indication information of a target reference signal resource, where an antenna port corresponding to the target reference signal resource corresponds to an antenna port of a transport channel through a precoding matrix — 110

Transmit the indication information — 120

(56) References Cited

U.S. PATENT DOCUMENTS

| | | | |
|---|---|---|---|
| 2016/0020846 A1 | 1/2016 | Wang et al. | |
| 2020/0296749 A1* | 9/2020 | Freda | H04W 28/0268 |
| 2021/0273695 A1* | 9/2021 | He | H04B 7/0486 |
| 2022/0123798 A1* | 4/2022 | Jin | H04B 7/063 |

FOREIGN PATENT DOCUMENTS

| | | | | |
|---|---|---|---|---|
| CN | 107733482 A | 2/2018 | | |
| CN | 108322241 A | 7/2018 | | |
| CN | 108988919 A | 12/2018 | | |
| CN | 110073608 A | 7/2019 | | |
| CN | 111106917 A | 5/2020 | | |
| EP | 3136778 A1 * | 3/2017 | | H04B 7/0413 |
| EP | 3700267 A1 | 8/2020 | | |
| EP | 3731446 A1 | 10/2020 | | |
| RU | 2439843 C2 | 1/2012 | | |
| RU | 2526886 C2 | 8/2014 | | |
| RU | 2639945 C2 | 12/2017 | | |
| WO | 2018031422 A1 | 2/2018 | | |
| WO | 2018171786 A1 | 9/2018 | | |
| WO | 2019095898 A1 | 5/2019 | | |
| WO | 2019127199 A1 | 7/2019 | | |

OTHER PUBLICATIONS

Nokia, Alcatel-Lucent Shanghai Bell, "On the support of transmit diversity in NR for data and control channels", 3GPP TSG-RAN WG1 Meeting #86bis, Lisbon, Portugal Oct. 10-14, 2016, R1-1610256.
International Search Report for corresponding application PCT/CN2020/126027 filed Nov. 3, 2020; Mail date Jan. 29, 2021.
Huawei:, "Introduction of eFD-MIMI into 36.212;", 3GPP TSG-RAN Meeting #88, R1-1704149;, Feb. 17, 2017.

* cited by examiner

INDICATION METHOD AND DEVICE, INDICATION INFORMATION RECEIVING METHOD AND DEVICE, COMMUNICATION NODE, AND MEDIUM

CROSS-REFERENCE TO RELATED APPLICATIONS

This is a National Stage Application filed under 35 U.S.C. 371 based on International Patent Application No. PCT/CN2020/126027, filed on Nov. 3, 2020, which claims priority to Chinese Patent Application No. 201911067171.5 filed with the China National Intellectual Property Administration (CNIPA) on Nov. 4, 2019, the contents of which are incorporated herein by reference in their entireties.

TECHNICAL FIELD

The present application relates to wireless communication networks, for example, an indication method and apparatus, a method and apparatus for receiving indication information, a communication node, and a medium.

BACKGROUND

Between two communication nodes in wireless communication, a second communication node transmits a reference signal to a first communication node on a reference signal resource. According to the measurement result of the reference signal, the first communication node may make a decision and indicate an antenna port used by a transport channel of the second communication node, and also need to indicate an antenna port used by the second communication node to transmit a reference signal corresponding to the antenna port used by the transport channel of the second communication node. The signaling overhead occupied by indicating and transmitting antenna port information is relatively large, which affects the transmission efficiency of signaling and the efficiency of the wireless communication.

SUMMARY

The present application provides an indication method and apparatus, a method and apparatus for receiving indication information, a communication node, and a medium, to improve the efficiency of transmitting antenna port information.

An embodiment of the present application provides an indication method. The indication method is applied to a first communication node and includes that: indication information of a target reference signal resource is determined, where an antenna port corresponding to the target reference signal resource corresponds to an antenna port of a transport channel through a precoding matrix; and the indication information is transmitted.

An embodiment of the present application further provides a method for receiving indication information. The method for receiving the indication information is applied to a second communication node and includes that: indication information of a target reference signal resource is received, where an antenna port corresponding to the target reference signal resource corresponds to an antenna port of a transport channel through a precoding matrix; and the antenna port corresponding to the target reference signal resource and the antenna port of the transport channel are determined according to the indication information.

An embodiment of the present application further provides an indication apparatus. The apparatus includes an information determination module and an information transmission module.

The information determination module is configured to determine indication information of a target reference signal resource, where an antenna port corresponding to the target reference signal resource corresponds to an antenna port of a transport channel through a precoding matrix.

The information transmission module is configured to transmit the indication information.

An embodiment of the present application further provides an apparatus for receiving indication information. The apparatus includes an information receiving module and a port determination module.

The information receiving module is configured to receive indication information of a target reference signal resource, where an antenna port corresponding to the target reference signal resource corresponds to an antenna port of a transport channel through a precoding matrix.

The port determination module is configured to determine the antenna port corresponding to the target reference signal resource and the antenna port of the transport channel according to the indication information.

An embodiment of the present application further provides a first communication node. The first communication node includes one or more processors and a storage apparatus configured to store one or more programs.

The at least one program, when executed by the at least one processor, causes the at least one processor to implement the indication method described above.

An embodiment of the present application further provides a second communication node. The second communication node includes one or more processors and a storage apparatus configured to store one or more programs.

The one or more programs, when executed by the one or more processors, cause the one or more processors to perform the method for receiving indication information described above.

An embodiment of the present application further provides a computer-readable storage medium configured to store a computer program, where the computer program, when executed by a processor, implements the indication method or the method for receiving indication information described above.

DETAILED DESCRIPTION

Figure 1:
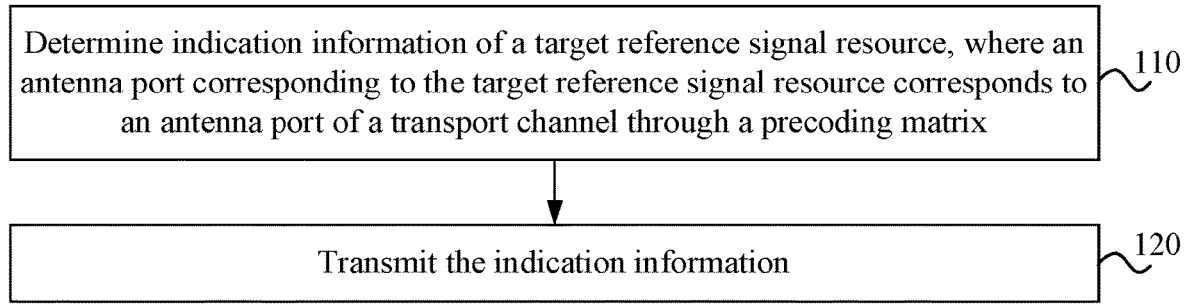
FIG. 1 is a flowchart of an indication method according to an embodiment.

The present application is described hereinafter in conjunction with drawings and embodiments. The embodiments described herein are merely intended to explain and not to limit the present application. For ease of description, only part, not all, of structures related to the present application are illustrated in the drawings.

Between two communication nodes in wireless communication, a second communication node transmits a reference signal to a first communication node on a reference signal resource. According to a measurement result of the reference signal, the first communication node may indicate an antenna port used by a transport channel of the second communication node, and also need to indicate an antenna port used by transmitting a reference signal corresponding to the antenna port used by the transport channel. Two communication nodes may be respectively a service node and a user equipment (UE) in the wireless communication network, or two UEs, etc. In a communication process, the signaling overhead occupied by indicating and transmitting antenna port information is relatively large, which affects the transmission efficiency of signaling and the efficiency of the wireless communication.

In an embodiment of the present application, an indication method is provided. A first communication node may indicate an antenna port for transmitting a reference signal and an antenna port of a transport channel by indicating a target reference signal resource to a second communication node, thereby saving the signaling overhead and the efficiency of transmitting the antenna port information. In embodiments of the present application, "first" and "second" are only used for distinguishing different communication nodes, different bit fields, or different channel transmission frequency domain groups, etc., but do not represent order or sequence.

FIG. 1 is a flowchart of an indication method according to an embodiment. The indication method of this embodiment is applied to a first communication node. As shown in FIG. 1, the method provided in this embodiment includes steps 110 and 120.

In step 110, indication information of a target reference signal resource is determined, where an antenna port corresponding to the target reference signal resource corresponds to an antenna port of a transport channel through a precoding matrix.

In this embodiment, the indication information is used for indicating the target reference signal resource, and the target reference signal resource is used for carrying a reference signal transmitted by a second communication node. The first communication node and the second communication node communicate through antenna ports, the antenna port corresponding to the target reference signal resource is an antenna port for transmitting the reference signal, and the antenna port of the transport channel is an antenna port used by the transport channel. The antenna port corresponding to the target reference signal resource is associated with or corresponds to the antenna port of the transport channel through the precoding matrix. In this case, the first communication node may indicate the antenna port of the target reference signal resource by indicating the target reference signal resource, and may indicate the antenna port of the transport channel according to a corresponding relationship represented by the precoding matrix. The indication information includes the indication information of the target reference signal resource, such as an index identifier of the target reference signal resource, so that antenna ports for two purposes can be indicated, the signaling overhead is saved, and the efficiency of indicating and transmitting the antenna port information is improved.

The antenna port for transmitting the reference signal is configured for the first communication node to measure. On the one hand, the antenna port of the reference signal for measurement is indicated by the first communication node, which may adapt to an unfixed and diverse communication environment and improve the measurement effect. On the other hand, an antenna port strategy may be determined based on a measurement result by indicating the antenna port for transmitting the reference signal, such as selecting the antenna port for transmitting the reference signal that has the best channel quality and is most favorable for channel transmission, to make a better decision about the antenna port and improve the efficiency and reliability of the communication. The antenna port of the transport channel is configured to transmit a channel, and the antenna port of the transport channel is determined based on measuring the antenna port for transmitting the reference signal, so that a better antenna port decision can be made to ensure the quality of the channel transmission, and thereby improving the communication efficiency. That is, the antenna port for transmitting the reference signal is indicated so that a corresponding relationship can be used for indicating the antenna port used for channel transmission, which is beneficial to channel transmission and improving communication efficiency.

The second communication node may determine the antenna port for transmitting the reference signal on the target reference signal resource according to the received indication information, and may also determine the antenna port of the transport channel according to the corresponding relationship between the antenna port of the transport channel and the antenna port for transmitting the reference signal. The antenna port of the transport channel corresponds to the antenna port corresponding to the target reference signal resource through the precoding matrix, and this corresponding relationship may be represented by the precoding matrix as $$\begin{bmatrix} z^{(p_0)}(i) \\ M \\ z^{(p_{\rho-1})}(i) \end{bmatrix} = W \begin{bmatrix} y^{(0)}(i) \\ M \\ y^{(v-1)}(i) \end{bmatrix},$$

where $$\begin{bmatrix} y^{(0)}(i) \\ M \\ y^{(v-1)}(i) \end{bmatrix}$$

is a vector representing a data symbol of the channel, and v represents the number of layers of the channel or the number of antenna ports of the transport channel;

$$\begin{bmatrix} z^{(p_0)}(i) \\ M \\ z^{(p_{\rho-1})}(i) \end{bmatrix}$$

is a vector representing a data symbol that is transmitted by the antenna port for transmitting the reference signal and corresponds to the data symbol on the channel, and $\rho$ represents the number of antennal ports for transmitting the reference signal; W is the precoding matrix, the number of rows is $\rho$, and the number of columns is v; and $$W\begin{bmatrix} y^{(0)}(i) \\ M \\ y^{(v-1)}(i) \end{bmatrix}$$

represents a matrix product of W and $$\begin{bmatrix} y^{(0)}(i) \\ M \\ y^{(v-1)}(i) \end{bmatrix}.$$

In step 120, the indication information is transmitted.

In this step, the indication information used for indicating the target reference signal resource is transmitted to the second communication node, and the indication information may include an index of the target reference signal resource and may also include the precoding matrix. The indication information used for indicating the target reference signal resource may indicate antenna ports for two purposes, so that the signaling overhead is saved, and the efficiency of indicating and transmitting the antenna port information is improved.

In an embodiment, the antenna port corresponding to the target reference signal resource is the same as the antenna port of the transport channel.

In this embodiment, the antenna port corresponding to the target reference signal resource is the antenna port of the transport channel, that is, the antenna ports for two purposes corresponding to the target reference signal resource are the same. For example, in the case where the precoding matrix between the antenna port corresponding to the target reference signal resource and the antenna port of the transport channel is a unit matrix or of other preset forms, the two antenna ports are the same.

In an embodiment, a frequency domain of the transport channel is divided into M channel transmission frequency domain groups, and the target reference signal resource is determined according to the channel transmission frequency domain groups, where M is a positive integer.

In this embodiment, the frequency domain of the transport channel refers to a frequency domain range used by the transport channel, also known as a channel transmission frequency domain. In a wireless transmission environment, multipath with different delays exists, different positions in the frequency domain have different transmission characteristics; at the same time, interference characteristics of different positions in the frequency domain are also inconsistent. The frequency domain of the transport channel is divided, and a target reference signal resource corresponding to each channel transmission frequency domain group is indicated in groups, so that the transmission characteristics and the interference characteristics of different positions in the frequency domain range can be adapted, and the flexibility of indication can be improved.

In an embodiment, the frequency domain of the transport channel is divided into M channel transmission frequency domain groups, and the precoding matrix is determined according to the channel transmission frequency domain groups, where M is a positive integer.

In this embodiment, the frequency domain of the transport channel is divided, and a precoding matrix corresponding to each channel transmission frequency domain group is indicated in groups, so that the transmission characteristics and the interference characteristics of different positions in the frequency domain range can be adapted, and the flexibility of indication can further be improved.

In the above embodiments, at least one of the target reference signal resource or the precoding matrix is determined according to channel transmission frequency domain groups. In some embodiments, the target reference signal resource or the precoding matrix may not be determined according to the channel transmission frequency domain groups.

In an embodiment, a frequency domain range of the channel transmission frequency domain group is determined in at least one of the following manners: indicating by the first communication node, determining according to a frequency domain range of the transport channel or determining according to M and a frequency domain range of the transport channel.

In this embodiment, the frequency domain range of the channel transmission frequency domain group reflects the magnitude of the channel transmission frequency domain group. The frequency domain range of the channel transmission frequency domain group may be indicated by the first communication node, and the first communication node may determine the frequency domain range according to the wireless transmission environment, thereby having stronger adaptability and higher flexibility. The frequency domain of the transport channel may be divided according to an allocation unit, and a bit wide for indicating the frequency domain range of the channel transmission frequency domain group may be determined according to the magnitude of the allocation unit of the channel transmission frequency domain group. For example, if the allocation unit is larger, the number (M) of channel transmission frequency domain groups that can be allocated is relatively smaller, and the bit wide for indicating the frequency range of the channel transmission frequency domain group is smaller; conversely, the bit wide for indicating the frequency range of the channel transmission frequency domain group is larger. The bit wide for indicating the frequency range of the channel transmission frequency domain group may be determined according to the maximum value which can be allocated by the frequency domain of the transport channel. For example, if the maximum value (the maximum possible value of the number of groups) which can be allocated by the frequency domain of the transport channel is relatively small, the allocable number is relatively small, and the bit wide for indicating the frequency range of the channel transmission frequency domain group is relatively small; conversely, the bit wide for indicating the frequency range of the channel transmission frequency domain group is relatively large.

The frequency domain range of the channel transmission frequency domain group may be determined according to the frequency domain range of the transport channel. For example, if the frequency domain range of the transport channel is relatively large, the frequency domain range of the channel transmission frequency domain group is relatively large; conversely, the frequency domain range of the channel transmission frequency domain group is relatively small. The magnitude of the channel transmission frequency domain group may be determined according to the magnitude of the allocation unit of the frequency domain of the transport channel. For example, if the allocation unit is relatively small, the number of allocation units included in one channel transmission frequency domain group is relatively large; conversely, the number of allocation units included in one channel transmission frequency domain group is relatively small. The magnitude of the channel transmission frequency domain group may be determined according to the allocable maximum value (the maximum possible value of the number of groups) of the frequency domain of the transport channel. For example, if the allocable maximum value of the frequency domain of the transport channel is relatively small, the channel transmission frequency domain group is relatively small; conversely, the channel transmission frequency domain group is relatively large.

The frequency domain range of the channel transmission frequency domain group may be determined according to M and the frequency domain range of the transport channel. In this embodiment, the frequency domain range of the channel transmission frequency domain group is the frequency domain range of the transport channel divided by the number (M) of groups.

The frequency domain range of the channel transmission frequency domain group may be determined according to the above-mentioned various manners, such as the one manner of the above-mentioned various manners in which the largest frequency domain range is taken as the frequency domain range of the channel transmission frequency domain group. Therefore, the number of groups is as small as possible, thereby reducing the indication overhead.

In an embodiment, the frequency domain of the transport channel is divided in one of the following manners: determining a frequency domain range of one channel transmission frequency domain group according to a frequency domain range of another channel transmission frequency domain group; or determining that a frequency domain range of one channel transmission frequency domain group includes N setting frequency domain units, where N is a positive integer, and N is predefined by a protocol or determined by the first communication node.

In this embodiment, in a dividing process of the frequency domain of the transport channel, the frequency domain range of one channel transmission frequency domain group may be determined according to the frequency domain range of another channel transmission frequency domain group, i.e. is implicitly indicated according to the frequency domain range of another channel transmission frequency domain group, or may be derived from the frequency domain range of another channel transmission frequency domain group. For example, a channel transmission frequency domain is composed of sub-bands marked with 0, 1, 2, 3, 4 and 5, and each sub-band is a frequency domain unit; the channel transmission frequency domain is divided into two channel transmission frequency domain groups, and a first channel transmission frequency domain group is composed of sub-bands marked with 0, 1 and 2, in which case a second channel transmission frequency domain group is composed of sub-bands remaining in the channel transmission frequency domain after the sub-bands included in the first channel transmission frequency domain group are removed, that is, the second channel transmission frequency domain group is composed of sub-bands marked with 3, 4 and 5. In the case where a frequency domain range of the first channel transmission frequency domain group is determined, a frequency domain range of the second channel transmission frequency domain group may be derived from the frequency domain range of the first channel transmission frequency domain group. For another example, a channel transmission frequency domain is composed of sub-bands marked with 0, 1, 2, 3, 4 and 5 and is divided into three channel transmission frequency domain groups, a first channel transmission frequency domain group is composed of sub-bands marked with 0 and 2, and a second channel transmission frequency domain group is composed of sub-bands marked with 1 and 4, in which case a third channel transmission frequency domain group is composed of sub-bands remaining in the channel transmission frequency domain after the sub-bands included in the first channel transmission frequency domain group and the sub-bands included in the second channel transmission frequency domain group are removed, that is, the third channel transmission frequency domain group is composed of sub-bands marked with 3 and 5. That is, in the case where the frequency domain range of the first channel transmission frequency domain group and the frequency domain range of the second channel transmission frequency domain group are determined, the frequency domain range of the third channel transmission frequency domain group may be derived from the frequency domain range of the first channel transmission frequency domain group and the frequency domain range of the second channel transmission frequency domain group. The frequency domain range of one channel transmission frequency domain group is implicitly indicated according to the frequency domain range of another channel transmission frequency domain group, thus saving overhead and improving the efficiency of indicating the frequency domain range of the channel transmission frequency domain group.

In this embodiment, in a dividing process of the frequency domain of the transport channel, a frequency domain range of one channel transmission frequency domain group includes N setting frequency domain units, where N is a positive integer, and N is predefined by a protocol or determined by the first communication node. In this embodiment, one channel transmission frequency domain group is composed of N frequency domain units indicated from the channel transmission frequency domain according to an agreed frequency domain unit. For example, the channel transmission frequency domain is composed of sub-bands marked with 0, 1, 2, 3, 4 and 5, and indicates that N sub-bands in the channel transmission frequency domain constitute the first channel transmission frequency domain group. A value of N is determined in advance by a protocol or by the first communication node. For example, the value of N is 2, and it is indicated the sub-bands marked with 1 and 3 constitute the first channel transmission frequency domain group. In this manner, the first communication node can flexibly divide the channel transmission frequency domain according to the wireless transmission environment, so that the best antenna port strategy can be determined according to the wireless transmission environment.

In an embodiment, M is determined according to at least one of the following: 1) a number of bits for indicating the target reference signal resource; 2) for each channel transmission frequency domain group, a number of reference signal resources allowed to be selected from a reference signal resource set; 3) a number of reference signal resources included in a reference signal resource set, where the target reference signal resource is selected from the reference signal resource set; 4) a magnitude of a frequency domain range of the transport channel; or 5) a maximum value of a frequency domain range of the transport channel.

In this embodiment, M may be determined in manner 1). For example, the number M of channel transmission frequency domain groups is determined according to the total number of bits for indicating the target reference signal resource, the total number of bits for indicating the target reference signal resource is relatively large, and the value of M is relatively large; conversely, the value of M is relatively small. For example, the number M of channel transmission frequency domain groups is determined according to the number of bits for indicating the target reference signal resource corresponding to one channel transmission frequency domain group, the number of bits required for indicating the target reference signal resource corresponding to one channel transmission frequency domain group is relatively small, and the value of M is relatively large; conversely, the value of M is relatively small.

In this embodiment, alternatively, M may be determined in manner 2). The indicated target reference signal resource is selected from one reference signal resource set, and the maximum number of selectable target reference signal resources for one channel transmission frequency domain group is the maximum number of target reference signal resources for one channel transmission frequency domain group that may be indicated. For example, for each channel transmission frequency domain group, if the number of target reference signal resources allowed to be selected from a reference signal resource set is relatively large, the number of channel transmission frequency domain groups is relatively small; conversely, the number of channel transmission frequency domain groups is relatively large. For example, for each channel transmission frequency domain group, the number of target reference signal resources allowed to be selected corresponds to one selected combination number, for example, if one resource is selected from four resources, the combination number is four, and if two resources are selected from four resources, the combination number is six. In this case, the combination number is relatively large, and M is set to be relatively small, thus saving the indication overhead; conversely, M is set to be relatively large.

In this embodiment, alternatively, M may be determined in manner 3). The indicated target reference signal resource is selected from one reference signal resource set, and the reference signal resource set is a reference signal resource set to which the indicated target reference signal resource belongs. For example, if the number of reference signal resources included in the reference signal resource set is relatively large, the number M of channel transmission frequency domain groups is relatively small, and thus the target reference signal resources may be indicated according to the smaller number of groups, thus saving the indication overhead; conversely, if the number of reference signal resources included in the reference signal resource set is relatively small, and the number M of channel transmission frequency domain groups may be relatively large.

In this embodiment, alternatively, M may be determined in manner 4). For example, the larger the frequency domain range of the transport channel, the larger the maximum value (the possible value of the number of groups that can be divided) that can be allocated to the channel transmission frequency domain, and the larger the number M of the channel transmission frequency domain groups; conversely, the number M of channel transmission frequency domain groups is relatively small.

In this embodiment, alternatively, M may be determined in manner 5). For example, the larger the maximum value of the frequency domain range of the transport channel, the larger the number M of channel transmission frequency domain groups; conversely, the number M of channel transmission frequency domain groups is relatively small.

In the above embodiments, for the frequency domain group of the transport channel, an allocation unit may be one or more sub-bands, or may be a frequency domain bandwidth within a certain range, etc. The present application does not limit forms and measurement units of the allocation unit. The frequency domain range of the transport channel may refer to the size of a bandwidth, the number of allocation units included in the frequency domain, etc.

In an embodiment, M may be determined according to the above-mentioned various manners, such as the one manner of the above-mentioned various manners in which the smallest M is taken as the number of channel transmission frequency domain groups for dividing groups. Therefore, the number of groups is as small as possible, thereby reducing the indication overhead.

In an embodiment, the indication information satisfies at least one of the following: a) a first index identifier mapped into a first bit field being used for indicating a target reference signal resource of a first channel transmission frequency domain group, and one index identifier being used for indicating target reference signal resources under at least two numbers; b) a first index identifier mapped into a first bit field being used for indicating a target reference signal resource of a first channel transmission frequency domain group, and a second index identifier mapped into a second bit field and the first index identifier jointly indicate a target reference signal resource of a second channel transmission frequency domain group; c) a first index identifier mapped into a first bit field being used for indicating a target reference signal resource of a first channel transmission frequency domain group, and a second index identifier mapped into a second bit field and a number of target reference signal resources of the first channel transmission frequency domain group jointly indicate a target reference signal resource of a second channel transmission frequency domain group; d) a first index identifier mapped into a first bit field being used for indicating a target reference signal resource of a first channel transmission frequency domain group, where a bit wide of the first bit field is determined according to a number of target reference signal resources; e) a first index identifier mapped into a first bit field being used for indicating a target reference signal resource of a first channel transmission frequency domain group, and a second index identifier mapped into a second bit field being used for indicating a target reference signal resource of a second channel transmission frequency domain group, where a bit wide of the first bit field is determined according to a number of target reference signal resources indicated by the second bit field; f) a first index identifier mapped into a first bit field being used for indicating a target reference signal resource of a first channel transmission frequency domain group, where a bit wide of the first bit field is determined according to one value of possible values of a number of to-be-indicated target reference signal resources in a corresponding reference signal resource set; g) a first index identifier mapped into a first bit field being used for indicating a target reference signal resource of a first channel transmission frequency domain group, where a bit wide of the first bit field is determined according to one value of possible values of a number of indexes of to-be-indicated target reference signal resources in a corresponding reference signal resource set; h) a first index identifier mapped into a first bit field being used for indicating a target reference signal resource of a first channel transmission frequency domain group, where a bit wide of the first bit field is determined according to a maximum value of possible values of a number of indexes of to-be-indicated target reference signal resources in a corresponding reference signal resource set; or i) a first index identifier mapped into a first bit field being used for indicating a target reference signal resource of a first channel transmission frequency domain group, where a bit wide of the first bit field is determined according to a maximum value of a frequency domain range of the transport channel.

In this embodiment, for a), the first index identifier mapped into the first bit field is used for indicating the target reference signal resource of the first channel transmission frequency domain group, and one index identifier is used for indicating the target reference signal resources under at least two numbers. The number of target reference signal resources indicated from one reference signal resource set may be different and a same index identifier may be used in the case of different numbers, thereby saving the number of index identifiers and saving the bit wide of the bit field, i.e. saving the number of bits in the bit field. Table 1 represents that target reference signal resources in different numbers are indicated by the same index identifier. As shown in Table 1, taking one reference signal resource set including reference signal resources marked with 0, 1 and 2 as an example, the index identifier 0 may indicate a target reference signal resource of which the number is 1 (that is, the reference signal resource marked with 0 is indicated), and may also indicate target reference signal resources of which the number is 2 (that is, the reference signal resources marked with 0 and 1 are indicated); the index identifier 1 may indicate the target reference signal resource of which the number is 1 (that is, the reference signal resource marked with 1 is indicated), may also indicate target reference signal resources of which the number is 2 (that is, the reference signal resources marked with 1 and 2 are indicated); and so on.

TABLE 1 indicating target reference signal resources in different numbers by the same index identifier

| Index identifier | The number of target reference signal resources is 1 | The number of target reference signal resources is 2 |
|---|---|---|
| 0 | A reference signal resource marked with 0 | Reference signal resources marked with 0 and 1 |
| 1 | A reference signal resource marked with 1 | Reference signal resources marked with 1 and 2 |
| 2 | A reference signal resource marked with 2 | Reference signal resources marked with 0 and 2 |

For the example in Table 1, the number of target reference signal resources is 1 or 2. If different index identifiers are used for the number of target reference signal resources under different numbers, six index identifiers are required to indicate all cases (except for index identifiers 0 to 2 which are the same as the case where the number is 1 in Table 1, an index identifier 3 is required to indicate the reference signal resources marked with 0 and 1, an index identifier 4 is required to indicate the reference signal resources marked with 1 and 2, and an index identifier 5 is required to indicate the reference signal resources marked with 0 and 2). However, in this embodiment, only three index identifiers are required to be used for indicating the target reference signal resources in different numbers, thereby reducing the number of bits in the bit field.

Table 2 represents another case where target reference signal resources in different numbers are indicated by the same index identifier. As shown in Table 2, taking one reference signal resource set including reference signal resources marked with 0, 1, 2 and 3 as an example, the index identifier 0 may indicate a target reference signal resource of which the number is 1 (that is, the reference signal resource marked with 0 is indicated), and may also indicate target reference signal resources of which the number is 2 (that is, the reference signal resources marked with 0 and 1 are indicated); the index identifier 2 may indicate the target reference signal resource of which the number is 1 (that is, the reference signal resource marked with 2 is indicated), may also indicate target reference signal resources of which the number is 2 (that is, the reference signal resources marked with 0 and 3 are indicated); and so on.

TABLE 2 indicating target reference signal resources in different numbers by the same index identifier

| Index identifier | The number of target reference signal resources is 1 | The number of target reference signal resources is 2 |
|---|---|---|
| 0 | A reference signal resource marked with 0 | Reference signal resources marked with 0 and 1 |
| 1 | A reference signal resource marked with 1 | Reference signal resources marked with 0 and 2 |
| 2 | A reference signal resource marked with 2 | Reference signal resources marked with 0 and 3 |
| 3 | A reference signal resource marked with 3 | Reference signal resources marked with 1 and 2 |
| 4 | Reserved | Reference signal resources marked with 1 and 3 |
| 5 | Reserved | Reference signal resources marked with 2 and 3 |

In the example shown in table 2, the number of index identifiers is 6. If different index identifiers are used for different numbers of reference signal resources, in the above examples, the number of index identifiers should be 10. Compared with using the same index identifier to indicate the reference signal resources in different numbers, it is necessary to use 4 more index identifiers, thus increasing the number of bits in the bit field. For the example in Table 2, the number of target reference signal resources is 1 or 2. If different index identifiers are used for the number of target reference signal resources in different numbers, ten index identifiers are required to indicate all cases (except for index identifiers 0 to 5 which are the same as the case where the number is 1 in Table 2, an index identifiers 6 to 9 are also required to indicate all the cases where the number is 2). However, in this embodiment, only six index identifiers are required to be used for indicating the target reference signal resources in different numbers, thereby reducing the number of bits in the bit field.

In this embodiment, for b), the first index identifier mapped into the first bit field is used for indicating the target reference signal resource of the first channel transmission frequency domain group, and the second index identifier mapped into the second bit field and the first index identifier jointly indicate the target reference signal resource of the second channel transmission frequency domain group. For example, a reference signal resource with the smaller label among the reference signal resources of the first channel transmission frequency domain group indicated by the index identifier mapped into the first bit field and a reference signal resource indicated by the index identifier mapped into the second bit field jointly constitute the target reference signal resource of the second channel transmission frequency domain group. For example, one reference signal resource set includes reference signal resources marked with 0, 1, 2, and 3; the reference signal resources of the first channel transmission frequency domain group indicated by the index identifier mapped into the first bit field are reference signal resources marked with 2 and 3, and a reference signal resource with the smaller number is the reference signal resource marked with 2; the reference signal resource indicated by the index identifier mapped into the second bit field is a reference signal resource marked with 1; the reference signal resource with the smaller number among the reference signal resources of the first channel transmission frequency domain group indicated by the index identifier mapped into the first bit field and the reference signal resource indicated by the index identifier mapped into the second bit field jointly constitute the reference signal resources of the second channel transmission frequency domain group, that is, the reference signal resources of the second channel transmission frequency domain group are the reference signal resources marked with 2 and 1. The manner of b) in this embodiment can save the number of index identifiers mapped into the second bit field used for indicating the reference signal resources of the second channel transmission frequency domain group, i.e. save the bit wide of the second bit field.

In this embodiment, for c), the number of reference signal resources of the first channel transmission frequency domain group indicated by the index identifier mapped into the first bit field and the index identifier mapped into the second bit field jointly indicate the target reference signal resource of the second channel transmission frequency domain group. For example, the number of reference signal resources of the first channel transmission frequency domain group indicated by the index identifier mapped into the first bit field is represented as x, the index identifier mapped into the second bit field is represented as y, and one reference signal resource set includes reference signal resources marked with 0, 1 and 2, so that x and y can jointly indicate the target reference signal resource of the second channel transmission frequency domain group. Table 3 represents that the first bit field and the second bit field jointly indicate the target reference signal resources of the second channel transmission frequency domain group. As shown in table 3, for example, the number of reference signal resources of the first channel transmission frequency domain group indicated by the index identifier mapped into the first bit field is 1, and the index identifier mapped into the second bit field is 2, so that two bit fields can jointly indicate that a target reference signal resource of the second channel transmission frequency domain group is a reference signal resource marked with 2.

TABLE 3 the first bit field and the second bit field jointly indicating the target reference signal resources of the second channel transmission frequency domain group

| (x, y) | The second channel transmission frequency domain group |
|---|---|
| (1, 0) | A reference signal resource marked with 0 |
| (1, 1) | A reference signal resource marked with 1 |
| (1, 2) | A reference signal resource marked with 2 |
| (2, 0) | Reference signal resources marked with 0 and 1 |
| (2, 1) | Reference signal resources marked with 1 and 2 |
| (2, 2) | Reference signal resources marked with 0 and 2 |

The manner of c) in this embodiment can save the number of index identifiers mapped into the second bit field used for indicating the reference signal resources of the second channel transmission frequency domain group, i.e. save the bit wide of the second bit field.

In this embodiment, for d), the first index identifier mapped into the first bit field is used for indicating the target reference signal resource of the first channel transmission frequency domain group, where the bit wide of the first bit field is determined according to the number of target reference signal resources. For example, the reference signal resource of the first channel transmission frequency domain group is indicated from one reference signal resource set, and the bit wide of the first bit field is determined by the possible combination number for the number of target reference signal resources extracted from one reference signal resource set. For example, the number of reference signal resources in the reference signal resource set is x, the number of target reference signal resources is y, the combination number of y target reference signal resources taken from the set including x reference signal resources is z, and then the bit wide of the first bit field is determined by z. This manner may save the overhead of the bit wide of the first bit field.

In this embodiment, for e), the first index identifier mapped into the first bit field is used for indicating the target reference signal resource of the first channel transmission frequency domain group, and the second index identifier mapped into the second bit field is used for indicating the target reference signal resource of the second channel transmission frequency domain group, where the bit wide of the first bit field is determined according to the number of target reference signal resources indicated by the second bit field. For example, the reference signal resource of the first channel transmission frequency domain group is indicated from one reference signal resource set, and the bit wide of the first bit field is determined according to the combination number for the number of target reference signal resources of the second channel transmission frequency domain group extracted from one reference signal resource set and indicated by the index identifier mapped into the second bit field. For example, the number of reference signal resources in the reference signal resource set is x, the number of target reference signal resources of the second channel transmission frequency domain group indicated by the index identifier mapped into the second bit field is y, the combination number of y target reference signal resources taken from the set including x reference signal resources is z, and then the bit wide of the first bit field is determined by z. Therefore, the overhead of indicating the bit wide of the first bit field can be saved, and the overhead of indicating the number of target reference signal resources of the first channel transmission frequency domain group can also be saved.

In some embodiments, the first index identifier mapped into the first bit field is used for indicating the target reference signal resource of the first channel transmission frequency domain group, and the second index identifier mapped into the second bit field is used for indicating the target reference signal resource of the second channel transmission frequency domain group, where the bit wide of the first bit field may be determined according to the logarithm (i.e., the logarithm of y in the above example) of the number of target reference signal resources indicated by the second bit field.

In this embodiment, for f), the first index identifier mapped into the first bit field is used for indicating the target reference signal resource of the first channel transmission frequency domain group, where the bit wide of the first bit field is determined according to one value of possible values of the number of to-be-indicated target reference signal resources in a corresponding resource set. For example, one reference signal resource set consists of reference signal resources marked with 0, 1, 2, and 3, the index identifier mapped into the first bit field indicates the target reference signal resource of the first channel transmission frequency domain group, the possible numbers of target reference signal resources constitutes a set {1, 2, 3, 4}, and the bit wide of the first bit field is determined by one element in the set, i.e., by one value of {1, 2, 3, 4}.

In this embodiment, for g), the first index identifier mapped into the first bit field being used for indicating the target reference signal resource of the first channel transmission frequency domain group, where the bit wide of the first bit field is determined according to one value of possible values of the number of indexes of to-be-indicated target reference signal resources in the reference signal resource set. For example, the reference signal resource of the second channel transmission frequency domain group is indicated from one reference signal resource set, one reference signal resource set is composed of reference signal resources marked with 0, 1, 2, and 3, the possible numbers of reference signal resources that need to be indicated constitute a set {1, 2, 3, 4}, the number of index identifiers indicating the target reference signal resource of which the number is 1 is 4, the number of index identifiers indicating the target reference signal resources of which the number is 2 is 6, the number of index identifiers indicating the target reference signal resources of which the number is 3 is 4, and the number of index identifiers indicating the target reference signal resources of which the number is 4 is 1. The bit wide of the second bit field may be determined by the number of index identifiers indicating the target reference signal resources of which the number is 2, or by the number of index identifiers indicating the target reference signal resources of which the number is 1, etc. Reference signal resource combinations that cannot be completely indicated are omitted. For example, the bit wide of the second bit field is determined by the number of index identifiers (the number of index identifiers is 4) indicating the target reference signal resources of which the number is 1, but the number of to-be-indicated target reference signal resources that needs to be actually indicated may be 2, and six indexes are needed, so that the second bit field is only enough to indicate the target reference signal resources corresponding to four index identifiers, and the remaining two index identifiers cannot indicate.

In this embodiment, for h), the first index identifier mapped into the first bit field is used for indicating the target reference signal resource of the first channel transmission frequency domain group, where the bit wide of the first bit field is determined according to the maximum value of possible values of the number of indexes of to-be-indicated target reference signal resources in the reference signal resource set. For example, the target reference signal resource of the second channel transmission frequency domain group is indicated from one reference signal resource set, and one reference signal resource set is composed of reference signal resources marked with 0, 1, 2, and 3, the possible numbers of target reference signal resources that need to be indicated constitute a set {1, 2, 3, 4}, the number of index identifiers indicating the target reference signal resource whose number is 1 is 4, the number of index identifiers indicating the target reference signal resources of which the number is 2 is 6, the number of index identifiers indicating the target reference signal resources of which the number is 3 is 4, the number of index identifiers indicating the target reference signal resources of which the number is 4 is 1, and the number of index identifiers indicating the target reference signal resources of which the number is 2 is at most 6, so that the bit wide of the second bit field is determined by the maximum value of the number of index identifiers under the possible number of target reference signal resources that need to be indicated, i.e., by the number of index identifiers indicating the target reference signal resources of which the number is 2.

In this embodiment, for i), the first index identifier mapped into the first bit field is used for indicating the target reference signal resource of the first channel transmission frequency domain group, where the bit wide of the first bit field is determined according to the maximum value of the frequency domain range of the transport channel. For example, if the maximum value of the frequency domain range of the transport channel is relatively large, the bit wide of the first bit field is relatively large; conversely, the bit wide of the first bit field is relatively small. The bit field is composed of bits in sequence, and the bit wide of the bit field is the number of bits. The maximum value of the frequency domain range of the transport channel may be understood as the magnitude of the maximum frequency domain range in the frequency domain range of a candidate transport channel that the first communication node can indicate. For example, the first communication node selects the frequency domain range of the transport channel from one bandwidth part, and may select the frequency domain range of the transport channel according to the magnitude of the maximum channel frequency domain range. For example, the first communication node selects the frequency domain range of the transport channel from one bandwidth part, and the magnitude of the maximum channel frequency domain range that can be selected is the magnitude of the frequency domain range of the bandwidth part.

In an embodiment, the bit field of the indication information may satisfy the above-mentioned various relationships, for example, part of the bit fields satisfies the indication manner of a) and part of the bit fields satisfies the indication manner of b), so that different indication strategies can be determined according to the actual wireless transmission environment, and the flexibility and applicability of the indication can be improved.

In an embodiment, the indication information includes an index of the target reference signal resource and the precoding matrix. In this embodiment, the precoding matrix between the antenna port corresponding to the target reference signal resource and the antenna port of the transport channel is also included in the indication information.

In an embodiment, the indication information satisfies at least one of the following: (1) a number of layers of a precoding matrix of a first channel transmission frequency domain group indicated by a first index identifier mapped into a first bit field and a second index identifier mapped into a second bit field jointly indicating a precoding matrix of a second channel transmission frequency domain group; (2) a first index identifier mapped into a first bit field being used for indicating a precoding matrix of a first channel transmission frequency domain group, where a bit wide of the first bit field is determined by a maximum value of possible values of a number of indexes of layers of a to-be-indicated precoding matrix; or (3) a first index identifier mapped into a first bit field being used for indicating a precoding matrix of a first channel transmission frequency domain group and a number of layers of the precoding matrix, where a bit wide of the first bit field is determined according to a maximum value of a frequency domain range of the transport channel.

In this embodiment, the precoding matrix is also included in the indication information and determined according to the channel transmission frequency domain groups.

For (1), the number of layers of the precoding matrix of the first channel transmission frequency domain group indicated by the first index identifier mapped into the first bit field and the second index identifier mapped into the second bit field jointly indicate the precoding matrix of the second channel transmission frequency domain group. For example, the number of layers of the precoding matrix of the first channel transmission frequency domain group indicated by the index identifier mapped into the first bit field is represented as x, the index identifier mapped into the second bit field is represented as y, and x and y may be used to jointly indicate the precoding matrix of the second channel transmission frequency domain group. Table 4 represents that the first bit field and the second bit field jointly indicate the precoding matrix of the second channel transmission frequency domain group. As shown in Table 4, for example, the number of layers of the precoding matrix of the first channel transmission frequency domain group indicated by the index identifier mapped into the first bit field is 1, and the index identifier mapped into the second bit field is 2, so that these two bit fields may jointly indicate that a precoding matrix corresponding to the second channel transmission frequency domain group is a precoding matrix marked with 2.

TABLE 4 the first bit field and the second bit field jointly indicating the precoding matrix of the second channel transmission frequency domain group

| (x, y) | The precoding matrix of the second channel transmission frequency domain group |
|---|---|
| (1, 0) | A precoding matrix marked with 0 |
| (1, 1) | A precoding matrix marked with 1 |
| (1, 2) | A precoding matrix marked with 2 |
| (2, 0) | A precoding matrix marked with 3 |
| (2, 1) | A precoding matrix marked with 4 |
| (2, 2) | A precoding matrix marked with 5 |

The manner of (1) in this embodiment can reduce the number of index identifiers mapped into the second bit field used for indicating the precoding matrix of the second channel transmission frequency domain group, i.e. save the bit wide of the second bit field.

For (2), the first index identifier mapped into the first bit field indicates the precoding matrix of the first channel transmission frequency domain group, where the bit wide of the first bit field is determined by the maximum value of the number of index identifiers under possible numbers of layers of a precoding matrix that needs to be indicated. For example, the number of index identifiers of the precoding matrix indicating that the number of layers is 1 is 4, the number of index identifiers of the precoding matrix indicating that the number of layers is 2 is 6, the number of index identifiers of the precoding matrix indicating that the number of layers is 3 is 4, and the number of index identifiers of the precoding matrix indicating that the number of layers is 4 is 1. The number of index identifiers of the precoding matrix indicating that the number of layers is 2 is the largest, and the bit wide of the first bit field is determined by the maximum number of index identifiers under the possible number of layers of the precoding matrix that needs to be indicated, i.e., by the number of index identifiers of reference signals indicating that the number of layers is 2.

For (3), the index identifier mapped into the first bit field indicates the precoding matrix and a number of layers of the precoding matrix, where the bit wide of the first bit field is determined according to the maximum value of the frequency domain range of the transport channel. For example, if the maximum value of the frequency domain range of the transport channel is relatively large, the bit wide of the first bit field is relatively large; conversely, the bit wide of the first bit field is relatively small. The bit field is composed of bits in sequence, and the bit wide of the bit field is the number of bits.

This embodiment saves the overhead of indication information and improves the efficiency of indicating and transmitting antenna port information through different frequency domain dividing manners, different manners of determining the frequency domain range of the channel transmission frequency domain group, different manners of determining the number M of groups and different manners of indicating reference signal resources.

In an embodiment, in the case where the precoding matrix is indicated, the bit field may also satisfy the above-mentioned various relationships. For example, part of the bit fields satisfies the indication manner of (1) and part of the bit fields satisfies the indication manner of (2), so that different indication strategies can be determined according to the actual wireless transmission environment, and the flexibility and applicability of the indication can be improved.

In an embodiment of the present application, a method for receiving indication information is further provided. An antenna port for transmitting a reference signal and an antenna port corresponding to a transport channel may be determined by receiving indication information of a target reference signal resource, thereby saving the signaling overhead and improving the efficiency of transmitting the antenna port information.

Figure 2:
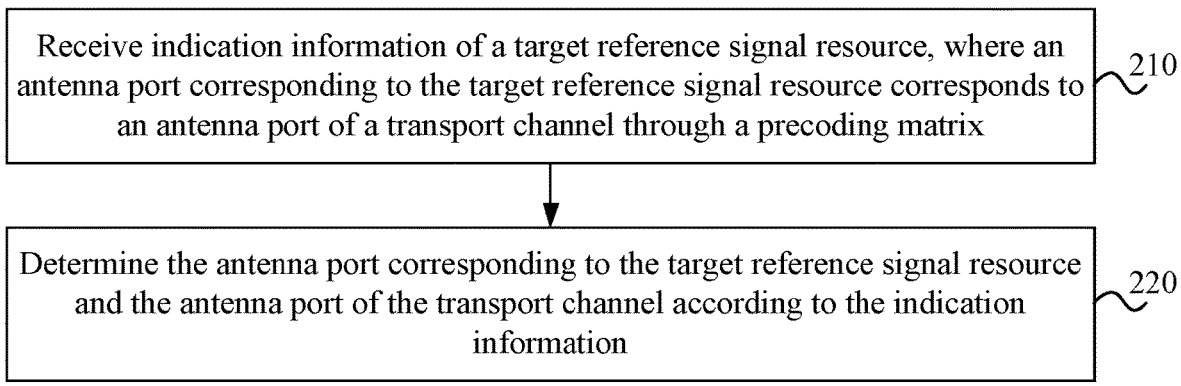
FIG. 2 is a flowchart of a method for receiving indication information according to an embodiment.

FIG. 2 is a flowchart of a method for receiving indication information according to an embodiment. As shown in FIG. 2, the method provided in this embodiment includes steps 210 and 220 described below.

In step 210, indication information of a target reference signal resource is received, where an antenna port corresponding to the target reference signal resource corresponds to an antenna port of a transport channel through a precoding matrix.

In step 220, the antenna port corresponding to the target reference signal resource and the antenna port of the transport channel are determined according to the indication information.

In this embodiment, the first communication node and the second communication node communicate through antenna ports, the indication information is used for indicating the target reference signal resource, the antenna port corresponding to the target reference signal resource is an antenna port for transmitting the reference signal, the antenna port of the transport channel is an antenna port for transmitting a channel, and the antenna port corresponding to the target reference signal resource is associated with or corresponds to the antenna port of the transport channel through the precoding matrix. In this case, the second communication node may determine the antenna port of the target reference signal resource according to the indication information from the first communication node for the target reference signal resource, and may also determine the antenna port of the transport channel according to a corresponding relationship represented by the precoding matrix, thereby saving the signaling overhead and improving the efficiency of indicating and transmitting the antenna port information.

In an embodiment, the antenna port corresponding to the target reference signal resource is the same as the antenna port of the transport channel.

For example, in the case where the precoding matrix is a unit matrix, it may be determined that the antenna port corresponding to the target reference signal resource and the antenna port of the transport channel are the same port.

In an embodiment, a frequency domain of the transport channel is divided into M channel transmission frequency domain groups, and the target reference signal resource is determined according to the channel transmission frequency domain groups, where M is a positive integer.

In an embodiment, a frequency domain of the transport channel is divided into M channel transmission frequency domain groups, and the precoding matrix is determined according to the channel transmission frequency domain groups, where M is a positive integer.

In an embodiment, a frequency domain range of the channel transmission frequency domain group is determined in at least one of the following manners: indicating by the first communication node, determining according to a frequency domain range of the transport channel or determining according to M and a frequency domain range of the transport channel.

In an embodiment, the frequency domain of the transport channel is divided in one of the following manners: determining a frequency domain range of one channel transmission frequency domain group according to a frequency domain range of another channel transmission frequency domain group, or determining that a frequency domain range of one channel transmission frequency domain group includes N setting frequency domain units, where N is a positive integer, and N is predefined by a protocol or determined by the first communication node.

In an embodiment, M is determined according to at least one of the following: a number of bits for indicating the target reference signal resource; for each channel transmission frequency domain group, a number of reference signal resources allowed to be selected from a reference signal resource set; a number of reference signal resources included in a reference signal resource set, where the target reference signal resource is selected from the reference signal resource set; a magnitude of a frequency domain range of the transport channel; or a maximum value of a frequency domain range of the transport channel.

In an embodiment, the indication information satisfies at least one of the following: a first index identifier mapped into a first bit field being used for indicating a target reference signal resource of a first channel transmission frequency domain group, and one index identifier being used for indicating target reference signal resources under at least two numbers; a first index identifier mapped into a first bit field being used for indicating a target reference signal resource of a first channel transmission frequency domain group, and a second index identifier mapped into a second bit field and the first index identifier jointly indicate a target reference signal resource of a second channel transmission frequency domain group; a first index identifier mapped into a first bit field being used for indicating a target reference signal resource of a first channel transmission frequency domain group, and a second index identifier mapped into a second bit field and a number of target reference signal resources of the first channel transmission frequency domain group jointly indicate a target reference signal reference of a second channel transmission frequency domain group; a first index identifier mapped into a first bit field being used for indicating a target reference signal resource of a first channel transmission frequency domain group, where a bit wide of the first bit field is determined according to a number of target reference signal resources; a first index identifier mapped into a first bit field being used for indicating a target reference signal resource of a first channel transmission frequency domain group, and a second index identifier mapped into a second bit field being used for indicating a target reference signal resource of a second channel transmission frequency domain group, where a bit wide of the first bit field is determined according to a number of target reference signal resources indicated by the second bit field; a first index identifier mapped into a first bit field being used for indicating a target reference signal resource of a first channel transmission frequency domain group, where a bit wide of the first bit field is determined according to one value of possible values of a number of to-be-indicated target reference signal resources in a corresponding reference signal resource set; a first index identifier mapped into a first bit field being used for indicating a target reference signal resource of a first channel transmission frequency domain group, where a bit wide of the first bit field is determined according to one value of possible values of a number of indexes of to-be-indicated target reference signal resources in a corresponding reference signal resource set; a first index identifier mapped into a first bit field being used for indicating a target reference signal resource of a first channel transmission frequency domain group, where a bit wide of the first bit field is determined according to a maximum value of possible values of a number of indexes of to-be-indicated target reference signal resources in a corresponding reference signal resource set; or a first index identifier mapped into a first bit field being used for indicating a target reference signal resource of a first channel transmission frequency domain group, where a bit wide of the first bit field is determined according to a maximum value of a frequency domain range of the transport channel.

In an embodiment, the indication information includes an index of the target reference signal resource and the precoding matrix.

In an embodiment, the indication information satisfies at least one of the following: a number of layers of a precoding matrix of a first channel transmission frequency domain group indicated by a first index identifier mapped into a first bit field and a second index identifier mapped into a second bit field jointly indicating a precoding matrix of a second channel transmission frequency domain group; a first index identifier mapped into a first bit field being used for indicating a precoding matrix of a first channel transmission frequency domain group, where a bit wide of the first bit field is determined by a maximum value of possible values of a number of indexes of layers of a to-be-indicated precoding matrix; or a first index identifier mapped into a first bit field being used for indicating a precoding matrix of a first channel transmission frequency domain group and a number of layers of the precoding matrix, where a bit wide of the first bit field is determined according to a maximum value of a frequency domain range of the transport channel.

Figure 3:
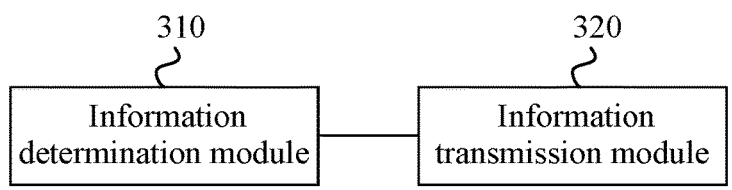
FIG. 3 is a structural diagram of an indication apparatus according to an embodiment.

An embodiment of the present application further provides an indication apparatus. FIG. 3 is a structural diagram of an indication apparatus according to an embodiment. As shown in FIG. 3, the indication apparatus includes an information determination module 310 and an information transmission module 320.

The information determination module 310 is configured to determine indication information of a target reference signal resource, where an antenna port corresponding to the target reference signal resource corresponds to an antenna port of a transport channel through a precoding matrix. The information transmission module 320 is configured to transmit the indication information.

The indication apparatus in this embodiment may indicate the antenna port for transmitting the reference signal and the antenna port corresponding to the transport channel by indicating the target reference signal resource, thereby saving the signaling overhead and improving the efficiency of transmitting the antenna port information.

The antenna port corresponding to the target reference signal resource is the same as the antenna port of the transport channel.

In an embodiment, a frequency domain of the transport channel is divided into M channel transmission frequency domain groups, and the target reference signal resource is determined according to the channel transmission frequency domain groups, where M is a positive integer.

In an embodiment, a frequency domain of the transport channel is divided into M channel transmission frequency domain groups, and the precoding matrix is determined according to the channel transmission frequency domain groups, where M is a positive integer.

In an embodiment, a frequency domain range of the channel transmission frequency domain group is determined in at least one of the following manners: indicating by the first communication node, determining according to a frequency domain range of the transport channel or determining according to M and a frequency domain range of the transport channel.

In an embodiment, the frequency domain of the transport channel is divided in one of the following manners: determining a frequency domain range of one channel transmission frequency domain group according to a frequency domain range of another channel transmission frequency domain group, or determining that a frequency domain range of one channel transmission frequency domain group includes N setting frequency domain units, where N is a positive integer, and N is predefined by a protocol or determined by the first communication node.

In an embodiment, M is determined according to at least one of the following: a number of bits for indicating the target reference signal resource; for each channel transmission frequency domain group, a number of reference signal resources allowed to be selected from a reference signal resource set; a number of reference signal resources included in a reference signal resource set, where the target reference signal resource is selected from the reference signal resource set; a magnitude of a frequency domain range of the transport channel; or a maximum value of a frequency domain range of the transport channel.

In an embodiment, the indication information satisfies at least one of the following: a first index identifier mapped into a first bit field being used for indicating a target reference signal resource of a first channel transmission frequency domain group, and one index identifier being used for indicating target reference signal resources under at least two numbers; a first index identifier mapped into a first bit field being used for indicating a target reference signal resource of a first channel transmission frequency domain group, and a second index identifier mapped into a second bit field and the first index identifier jointly indicate a target reference signal resource of a second channel transmission frequency domain group; a first index identifier mapped into a first bit field being used for indicating a target reference signal resource of a first channel transmission frequency domain group, and a second index identifier mapped into a second bit field and a number of target reference signal resources of the first channel transmission frequency domain group jointly indicate a target reference signal reference of a second channel transmission frequency domain group; a first index identifier mapped into a first bit field being used for indicating a target reference signal resource of a first channel transmission frequency domain group, where a bit wide of the first bit field is determined according to a number of target reference signal resources; a first index identifier mapped into a first bit field being used for indicating a target reference signal resource of a first channel transmission frequency domain group, and a second index identifier mapped into a second bit field being used for indicating a target reference signal resource of a second channel transmission frequency domain group, where a bit wide of the first bit field is determined according to a number of target reference signal resources indicated by the second bit field; a first index identifier mapped into a first bit field being used for indicating a target reference signal resource of a first channel transmission frequency domain group, where a bit wide of the first bit field is determined according to one value of possible values of a number of to-be-indicated target reference signal resources in a corresponding reference signal resource set; a first index identifier mapped into a first bit field being used for indicating a target reference signal resource of a first channel transmission frequency domain group, where a bit wide of the first bit field is determined according to one value of possible values of a number of indexes of to-be-indicated target reference signal resources in a corresponding reference signal resource set; a first index identifier mapped into a first bit field being used for indicating a target reference signal resource of a first channel transmission frequency domain group, where a bit wide of the first bit field is determined according to a maximum value of possible values of a number of indexes of to-be-indicated target reference signal resources in a reference signal resource set; or a first index identifier mapped into a first bit field being used for indicating a target reference signal resource of a first channel transmission frequency domain group, where a bit wide of the first bit field is determined according to a maximum value of a frequency domain range of the transport channel.

In an embodiment, the indication information includes an index of the target reference signal resource and the precoding matrix.

In an embodiment, the indication information satisfies at least one of the following: a number of layers of a precoding matrix of a first channel transmission frequency domain group indicated by a first index identifier mapped into a first bit field and a second index identifier mapped into a second bit field jointly indicating a precoding matrix of a second channel transmission frequency domain group; a first index identifier mapped into a first bit field being used for indicating a precoding matrix of a first channel transmission frequency domain group, where a bit wide of the first bit field is determined by a maximum value of possible values of a number of indexes of layers of a to-be-indicated precoding matrix; or a first index identifier mapped into a first bit field being used for indicating a precoding matrix of a first channel transmission frequency domain group and a number of layers of the precoding matrix, where a bit wide of the first bit field is determined according to a maximum value of a frequency domain range of the transport channel.

The indication apparatus provided in this embodiment and the indication method provided in the preceding embodiments belong to the same concept. For technical details not described in detail in this embodiment, reference may be made to any one of the preceding embodiments.

Figure 4:
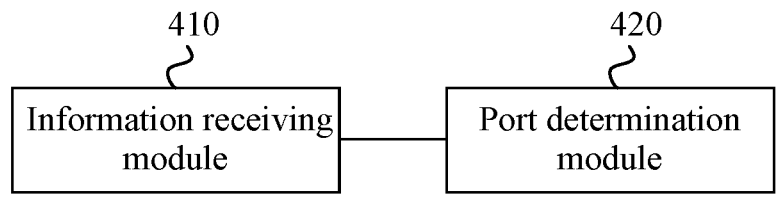
FIG. 4 is a structural diagram of an apparatus for receiving indication information according to an embodiment.

An embodiment of the present application further provides an apparatus for receiving indication information. FIG. 4 is a structural diagram of an apparatus for receiving indication information according to an embodiment. As shown in FIG. 4, the apparatus for receiving the indication information includes an information receiving module 410 and a port determination module 420.

The information receiving module 410 is configured to receive indication information of a target reference signal resource, where an antenna port corresponding to the target reference signal resource corresponds to an antenna port of a transport channel through a precoding matrix. The port determination module 420 is configured to determine the antenna port corresponding to the target reference signal resource and the antenna port of the transport channel according to the indication information.

The apparatus for receiving the indication information in this embodiment may determine the antenna port for transmitting the reference signal and the antenna port corresponding to the transport channel according to the indication information of the target reference signal resource, thereby saving the signaling overhead, improving the efficiency of transmitting the antenna port information and improving the efficiency of the wireless communication.

The antenna port corresponding to the target reference signal resource is the same as the antenna port of the transport channel.

In an embodiment, a frequency domain of the transport channel is divided into M channel transmission frequency domain groups, and the target reference signal resource is determined according to the channel transmission frequency domain groups, where M is a positive integer.

In an embodiment, a frequency domain of the transport channel is divided into M channel transmission frequency domain groups, and the precoding matrix is determined according to the channel transmission frequency domain groups, where M is a positive integer.

In an embodiment, a frequency domain range of the channel transmission frequency domain group is determined in at least one of the following manners: indicating by the first communication node, determining according to a frequency domain range of the transport channel or determining according to M and a frequency domain range of the transport channel.

In an embodiment, the frequency domain of the transport channel is divided in one of the following manners: determining a frequency domain range of one channel transmission frequency domain group according to a frequency domain range of another channel transmission frequency domain group, and determining that a frequency domain range of one channel transmission frequency domain group includes N setting frequency domain units, where N is a positive integer, and N is predefined by a protocol or determined by the first communication node.

In an embodiment, M is determined according to at least one of the following: a number of bits for indicating the target reference signal resource; for each channel transmission frequency domain group, a number of reference signal resources allowed to be selected from a reference signal resource set; a number of reference signal resources included in a reference signal resource set, where the target reference signal resource is selected from the reference signal resource set; a magnitude of a frequency domain range of the transport channel; or a maximum value of a frequency domain range of the transport channel.

In an embodiment, the indication information satisfies at least one of the following: a first index identifier mapped into a first bit field being used for indicating a target reference signal resource of a first channel transmission frequency domain group, and one index identifier being used for indicating target reference signal resources under at least two numbers; a first index identifier mapped into a first bit field being used for indicating a target reference signal resource of a first channel transmission frequency domain group, and a second index identifier mapped into a second bit field and the first index identifier jointly indicate a target reference signal resource of a second channel transmission frequency domain group; a first index identifier mapped into a first bit field being used for indicating a target reference signal resource of a first channel transmission frequency domain group, and a second index identifier mapped into a second bit field and a number of target reference signal resources of the first channel transmission frequency domain group jointly indicate a target reference signal reference of a second channel transmission frequency domain group; a first index identifier mapped into a first bit field being used for indicating a target reference signal resource of a first channel transmission frequency domain group, where a bit wide of the first bit field is determined according to a number of target reference signal resources; a first index identifier mapped into a first bit field being used for indicating a target reference signal resource of a first channel transmission frequency domain group, and a second index identifier mapped into a second bit field being used for indicating a target reference signal resource of a second channel transmission frequency domain group, where a bit wide of the first bit field is determined according to a number of target reference signal resources indicated by the second bit field; a first index identifier mapped into a first bit field being used for indicating a target reference signal resource of a first channel transmission frequency domain group, where a bit wide of the first bit field is determined according to one value of possible values of a number of to-be-indicated target reference signal resources in a corresponding reference signal resource set; a first index identifier mapped into a first bit field being used for indicating a target reference signal resource of a first channel transmission frequency domain group, where a bit wide of the first bit field is determined according to one value of possible values of a number of indexes of to-be-indicated target reference signal resources in a corresponding reference signal resource set; a first index identifier mapped into a first bit field being used for indicating a target reference signal resource of a first channel transmission frequency domain group, where a bit wide of the first bit field is determined according to a maximum value of possible values of a number of indexes of to-be-indicated target reference signal resources in a reference signal resource set; or a first index identifier mapped into a first bit field being used for indicating a target reference signal resource of a first channel transmission frequency domain group, where a bit wide of the first bit field is determined according to a maximum value of a frequency domain range of the transport channel.

In an embodiment, the indication information includes an index of the target reference signal resource and the precoding matrix.

In an embodiment, the indication information satisfies at least one of the following: a number of layers of a precoding matrix of a first channel transmission frequency domain group indicated by a first index identifier mapped into a first bit field and a second index identifier mapped into a second bit field jointly indicating a precoding matrix of a second channel transmission frequency domain group; a first index identifier mapped into a first bit field being used for indicating a precoding matrix of a first channel transmission frequency domain group, where a bit wide of the first bit field is determined by a maximum value of possible values of a number of indexes of layers of a to-be-indicated precoding matrix; or a first index identifier mapped into a first bit field being used for indicating a precoding matrix of a first channel transmission frequency domain group and a number of layers of the precoding matrix, where a bit wide of the first bit field is determined according to a maximum value of a frequency domain range of the transport channel.

The apparatus for receiving the indication information provided in this embodiment and the method for receiving the indication information provided in the preceding embodiments belong to the same concept. For technical details not described in detail in this embodiment, reference may be made to any one of the preceding embodiments.

An embodiment of the present application further provides a first communication node. The indication method may be performed by the indication apparatus which may be implemented by software and/or hardware and integrated into the first communication node.

Figure 5:
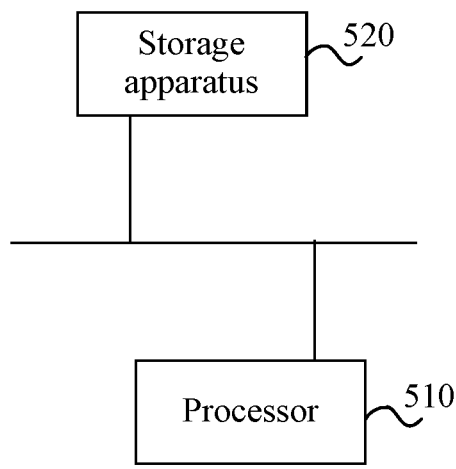
FIG. 5 is a structural diagram of a first communication node according to an embodiment.

FIG. 5 is a structural diagram of a first communication node according to an embodiment. As shown in FIG. 5, the first communication node provided in this embodiment includes a processor 510 and a storage apparatus 520. The first communication node may include one or more processors. One processor 510 is shown as an example in FIG. 5. The processor 510 and the storage apparatus 520 in the device may be connected via a bus or in other manners. The connection via the bus is shown as an example in FIG. 5.

One or more programs are executed by one or more processors 510 to cause the one or more processors to perform the indication method in any one of the preceding embodiments.

The storage apparatus 520 in the first communication node, as a computer-readable storage medium, may be configured to store one or more programs which may be software programs, computer-executable programs and modules, such as program instructions/modules (for example, modules in the indication apparatus, including the information determination module 310 and the information transmission module 320, as shown in FIG. 3) corresponding to the indication method in embodiments of the present application. The processor 510 executes software programs, instructions, and modules stored in the storage apparatus 520 to perform various function applications and data processing of the first communication node, that is, to implement the indication method in the preceding method embodiments.

The storage apparatus 520 mainly includes a program storage region and a data storage region. The program storage region may store an operating system and an application program required by at least one function. The data storage region may store data (such as the indication information and the precoding matrix in the preceding embodiments) created according to the use of the device. Additionally, the storage apparatus 520 may include a high-speed random-access memory and may further include a nonvolatile memory, for example, at least one magnetic disk memory, a flash memory, or another nonvolatile solid-state memory. In some examples, the storage apparatus 520 may further include memories that are remotely disposed with respect to the processor 510. These remote memories may be connected to the first communication node via a network. Examples of the preceding network include, but are not limited to, the Internet, an intranet, a local area network, a mobile communication network and a combination thereof.

When one or more programs included in the first communication node are performed by one or more processors 510, the first communication node implements the following operations: determining indication information of a target reference signal resource, where an antenna port corresponding to the target reference signal resource corresponds to an antenna port of a transport channel through a precoding matrix; and transmitting the indication information.

The first communication node provided in this embodiment and the indication method provided in the preceding embodiments belong to the same concept. For technical details not described in detail in this embodiment, reference may be made to any one of the preceding embodiments.

An embodiment of the present application further provides a second communication node. The method for receiving indication information may be performed by the apparatus for receiving indication information which may be implemented by software and/or hardware and integrated into the second communication node.

Figure 6:
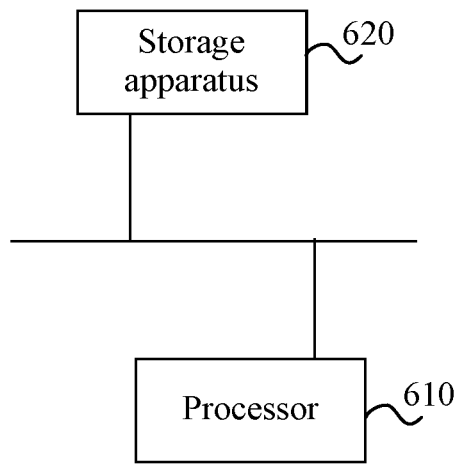
FIG. 6 is a structural diagram of a second communication node according to an embodiment.

FIG. 6 is a structural diagram of a second communication node according to an embodiment. As shown in FIG. 6, the second communication node provided in this embodiment includes a processor 610 and a storage apparatus 620. The second communication node may include one or more processors. One processor 610 is shown as an example in FIG. 6. The processor 610 and the storage apparatus 620 in the device may be connected via a bus or in other manners. The connection via the bus is shown as an example in FIG. 6.

One or more programs are executed by one or more processors 610 to cause the one or more processors 610 to perform the method for receiving indication information in any one of the preceding embodiments.

The storage apparatus 620 in the second communication node, as a computer-readable storage medium, may be configured to store one or more programs which may be software programs, computer-executable programs and modules, such as program instructions/modules (for example, modules in the apparatus for receiving indication information, including the information receiving module 410 and the port determination module 420, as shown in FIG. 4) corresponding to the indication method for receiving indication information in embodiments of the present application. The processor 610 executes software programs, instructions, and modules stored in the storage apparatus 620 to perform various function applications and data processing of the second communication node, that is, to implement the method for receiving indication information in the preceding method embodiments.

The storage apparatus 620 mainly includes a program storage region and a data storage region. The program storage region may store an operating system and an application program required by at least one function. The data storage region may store data (such as the indication information and the precoding matrix in the preceding embodiments) created according to the use of the device. Additionally, the storage apparatus 620 may include a high-speed random-access memory and may further include a nonvolatile memory, for example, at least one magnetic disk memory, a flash memory, or another nonvolatile solid-state memory. In some examples, the storage apparatus 620 may further include memories which are remotely disposed with respect to the processor 610. These remote memories may be connected to the second communication node via a network. Examples of the preceding network include, but are not limited to, the Internet, an intranet, a local area network, a mobile communication network and a combination thereof.

When one or more programs included in the second communication node are performed by one or more processors 610, the second communication node implements the following operations: receiving indication information of a target reference signal resource, where an antenna port corresponding to the target reference signal resource corresponds to an antenna port of a transport channel through a precoding matrix, and determining the antenna port corresponding to the target reference signal resource and the antenna port of the transport channel according to the indication information.

The second communication node provided in this embodiment and the method for receiving indication information provided in the preceding embodiments belong to the same concept. For technical details not described in detail in this embodiment, reference may be made to any one of the preceding embodiments.

An embodiment of the present application further provides a storage medium including computer-executable instructions. When executed by a computer processor, the computer-executable instructions cause the computer processor to perform an indication method or a method for receiving indication information.

From the preceding description of embodiments, it is apparent to those skilled in the art that the present application may be implemented by means of software and general-purpose hardware or may be implemented by hardware. Based on this understanding, the technical schemes provided by the present application may be embodied in the form of a software product. The software product is stored in a computer-readable storage medium, such as a computer floppy disk, a read-only memory (ROM), a random access memory (RAM), a flash, a hard disk, or an optical disk, and includes multiple instructions for enabling a computer device (which may be a personal computer, a server, or a network device) to perform the method of any one of the embodiments of the present application.

The above are only exemplary embodiments of the present application and are not intended to limit the scope of the present application.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for the local technical environment and may be implemented by using any suitable data storage technology, such as, but not limited to, a ROM, a RAM, an optical storage apparatus and system (a digital video disc (DVD) or a compact disc (CD))), and the like. Computer-readable media may include non-transitory storage media. The data processor may be of any type suitable to the local technical environment, such as, but is not limited to, a general-purpose computer, a special purpose computer, a microprocessor, a digital signal processor (DSP), an application-specific integrated circuit (ASIC), a field-programmable gate array (FPGA), and a processor based on a multi-core processor architecture.

What is claimed is:

1. An indication method, applied to a first communication node, comprising:
   determining indication information of a target reference signal resource that comprises an index of the target reference signal resource and a corresponding relationship between an antenna port corresponding to the target reference signal resource and to an antenna port of a transport channel, wherein the corresponding relationship is represented through a precoding matrix, the antenna port corresponding to the target reference signal resource is used by a second communication node for transmitting the target reference signal resource, and the antenna port of the transport channel is an antenna port used by the transport channel of the second communication node; and
   transmitting the indication information to the second communication node.

2. The indication method of claim 1, wherein the antenna port corresponding to the target reference signal resource is the same as the antenna port of the transport channel.

3. The indication method of claim 1, wherein a frequency domain of the transport channel is divided into M channel transmission frequency domain groups, and the target reference signal resource is determined according to the M channel transmission frequency domain groups, wherein M is a positive integer.

4. The indication method of claim 3, wherein a frequency domain range of each of the M channel transmission frequency domain groups is determined in at least one of the following manners:
   indicating by the first communication node;
   determining according to a frequency domain range of the transport channel; or
   determining according to M and a frequency domain range of the transport channel.

5. The indication method of claim 3, wherein the frequency domain of the transport channel is divided in at least one of the following manners:
   determining a frequency domain range of one channel transmission frequency domain group of the M channel transmission frequency domain groups according to a frequency domain range of another channel transmission frequency domain group of the M channel transmission frequency domain groups; or
   determining that a frequency domain range of one channel transmission frequency domain group comprises N setting frequency domain units, wherein N is a positive integer, and N is predefined by a protocol or determined by the first communication node.

6. The indication method of claim 3, wherein M is determined according to at least one of the following:
   a number of bits for indicating the target reference signal resource;
   for each of the M channel transmission frequency domain groups, a number of reference signal resources allowed to be selected from a reference signal resource set;
   a number of reference signal resources comprised in a reference signal resource set, wherein the target reference signal resource is selected from the reference signal resource set;
   a magnitude of a frequency domain range of the transport channel; or
   a maximum value of a frequency domain range of the transport channel.

7. The indication method of claim 3, wherein the indication information satisfies at least one of the following:
   a first index identifier mapped into a first bit field being used for indicating a target reference signal resource of a first channel transmission frequency domain group, and one index identifier being used for indicating target reference signal resources under at least two numbers;
   a first index identifier mapped into a first bit field being used for indicating a target reference signal resource of a first channel transmission frequency domain group, and a second index identifier mapped into a second bit field and the first index identifier jointly indicate a target reference signal resource of a second channel transmission frequency domain group;
   a first index identifier mapped into a first bit field being used for indicating a target reference signal resource of a first channel transmission frequency domain group, and a second index identifier mapped into a second bit field and a number of target reference signal resources of the first channel transmission frequency domain group jointly indicate a target reference signal resource of a second channel transmission frequency domain group;

a first index identifier mapped into a first bit field being used for indicating a target reference signal resource of a first channel transmission frequency domain group, wherein a bit wide of the first bit field is determined according to a number of target reference signal resources;

a first index identifier mapped into a first bit field being used for indicating a target reference signal resource of a first channel transmission frequency domain group, and a second index identifier mapped into a second bit field being used for indicating a target reference signal resource of a second channel transmission frequency domain group, wherein a bit wide of the first bit field is determined according to a number of target reference signal resources indicated by the second bit field;

a first index identifier mapped into a first bit field being used for indicating a target reference signal resource of a first channel transmission frequency domain group, wherein a bit wide of the first bit field is determined according to one value of possible values of a number of to-be-indicated target reference signal resources in a reference signal resource set;

a first index identifier mapped into a first bit field being used for indicating a target reference signal resource of a first channel transmission frequency domain group, wherein a bit wide of the first bit field is determined according to one value of possible values of a number of indexes of to-be-indicated target reference signal resources in a reference signal resource set;

a first index identifier mapped into a first bit field being used for indicating a target reference signal resource of a first channel transmission frequency domain group, wherein a bit wide of the first bit field is determined according to a maximum value of possible values of a number of indexes of to-be-indicated target reference signal resources in a reference signal resource set; or a first index identifier mapped into a first bit field being used for indicating a target reference signal resource of a first channel transmission frequency domain group, wherein a bit wide of the first bit field is determined according to a maximum value of a frequency domain range of the transport channel.

8. The indication method of claim 1, wherein a frequency domain of the transport channel is divided into M channel transmission frequency domain groups, and the precoding matrix is determined according to the M channel transmission frequency domain groups, wherein M is a positive integer.

9. The indication method of claim 8, wherein the indication information satisfies at least one of the following:

a number of layers of a precoding matrix of a first channel transmission frequency domain group indicated by a first index identifier mapped into a first bit field and a second index identifier mapped into a second bit field jointly indicating a precoding matrix of a second channel transmission frequency domain group;

a first index identifier mapped into a first bit field being used for indicating a precoding matrix of a first channel transmission frequency domain group, wherein a bit wide of the first bit field is determined by a maximum value of possible values of a number of indexes of layers of a to-be-indicated precoding matrix; or a first index identifier mapped into a first bit field being used for indicating a precoding matrix of a first channel transmission frequency domain group and a number of layers of the precoding matrix, wherein a bit wide of the first bit field is determined according to a maximum value of a frequency domain range of the transport channel.

10. The indication method of claim 8, wherein a frequency domain range of each of the M channel transmission frequency domain groups is determined in at least one of the following manners:

indicating by the first communication node;

determining according to a frequency domain range of the transport channel; or determining according to M and a frequency domain range of the transport channel.

11. The indication method of claim 8, wherein the frequency domain of the transport channel is divided in at least one of the following manners:

determining a frequency domain range of one channel transmission frequency domain group of the M channel transmission frequency domain groups according to a frequency domain range of another channel transmission frequency domain group of the M channel transmission frequency domain groups; or determining that a frequency domain range of one channel transmission frequency domain group comprises N setting frequency domain units, wherein N is a positive integer, and N is predefined by a protocol or determined by the first communication node.

12. The indication method of claim 8, wherein M is determined according to at least one of the following:

a number of bits for indicating the target reference signal resource;

for each of the M channel transmission frequency domain groups, a number of reference signal resources allowed to be selected from a reference signal resource set;

a number of reference signal resources comprised in a reference signal resource set, wherein the target reference signal resource is selected from the reference signal resource set;

a magnitude of a frequency domain range of the transport channel; or a maximum value of a frequency domain range of the transport channel.

13. The indication method of claim 8, wherein the indication information satisfies at least one of the following:

a first index identifier mapped into a first bit field being used for indicating a target reference signal resource of a first channel transmission frequency domain group, and one index identifier being used for indicating target reference signal resources under at least two numbers;

a first index identifier mapped into a first bit field being used for indicating a target reference signal resource of a first channel transmission frequency domain group, and a second index identifier mapped into a second bit field and the first index identifier jointly indicate a target reference signal resource of a second channel transmission frequency domain group;

a first index identifier mapped into a first bit field being used for indicating a target reference signal resource of a first channel transmission frequency domain group, and a second index identifier mapped into a second bit field and a number of target reference signal resources of the first channel transmission frequency domain group jointly indicate a target reference signal resource of a second channel transmission frequency domain group;

a first index identifier mapped into a first bit field being used for indicating a target reference signal resource of a first channel transmission frequency domain group, wherein a bit wide of the first bit field is determined according to a number of target reference signal resources;

a first index identifier mapped into a first bit field being used for indicating a target reference signal resource of a first channel transmission frequency domain group, and a second index identifier mapped into a second bit field being used for indicating a target reference signal resource of a second channel transmission frequency domain group, wherein a bit wide of the first bit field is determined according to a number of target reference signal resources indicated by the second bit field;

a first index identifier mapped into a first bit field being used for indicating a target reference signal resource of a first channel transmission frequency domain group, wherein a bit wide of the first bit field is determined according to one value of possible values of a number of to-be-indicated target reference signal resources in a reference signal resource set;

a first index identifier mapped into a first bit field being used for indicating a target reference signal resource of a first channel transmission frequency domain group, wherein a bit wide of the first bit field is determined according to one value of possible values of a number of indexes of to-be-indicated target reference signal resources in a reference signal resource set;

a first index identifier mapped into a first bit field being used for indicating a target reference signal resource of a first channel transmission frequency domain group, wherein a bit wide of the first bit field is determined according to a maximum value of possible values of a number of indexes of to-be-indicated target reference signal resources in a reference signal resource set; or a first index identifier mapped into a first bit field being used for indicating a target reference signal resource of a first channel transmission frequency domain group, wherein a bit wide of the first bit field is determined according to a maximum value of a frequency domain range of the transport channel.

14. A non-transitory computer-readable storage medium configured to store a computer program, wherein the computer program, when executed by a processor, implements the indication method of claim 1.

15. A method for receiving indication information, applied to a second communication node, comprising:

receiving indication information of a target reference signal resource transmitted by a first communication node, wherein the indication information comprises an index of the target reference signal resource and a corresponding relationship between an antenna port corresponding to the target reference signal resource and an antenna port of a transport channel, the corresponding relationship is represented through a precoding matrix, the antenna port corresponding to the target reference signal resource is used for transmitting the target reference signal resource, and the antenna port of the transport channel is an antenna port used by the transport channel of the second communication node; and determining the antenna port corresponding to the target reference signal resource and the antenna port of the transport channel according to the indication information.

16. A second communication node, comprising:

at least one processor; and a storage apparatus, which is configured to store at least one program;

wherein the at least one program, when executed by the at least one processor, causes the at least one processor to perform the method for receiving indication information of claim 13.

17. A non-transitory computer-readable storage medium configured to store a computer program, wherein the computer program, when executed by a processor, implements the method for receiving indication information of claim 15.

18. A first communication node, comprising:

at least one processor; and a storage apparatus, which is configured to store at least one program;

wherein the at least one program, when executed by the at least one processor, causes the at least one processor to perform the following:

determining indication information of a target reference signal resource that comprises an index of the target reference signal resource and a corresponding relationship between an antenna port corresponding to the target reference signal resource and an antenna port of a transport channel, wherein the corresponding relationship is represented through a precoding matrix, the antenna port corresponding to the target reference signal resource is used by a second communication node for transmitting the target reference signal resource, and the antenna port of the transport channel is an antenna port used by the transport channel of the second communication node; and transmitting the indication information to the second communication node.

19. The first communication node of claim 18, wherein the antenna port corresponding to the target reference signal resource is the same as the antenna port of the transport channel.

\* \* \* \* \*